United States Patent
Weickel et al.

(10) Patent No.: US 6,901,905 B2
(45) Date of Patent: Jun. 7, 2005

(54) PRE-COMBUSTION CHAMBER ENRICHMENT

(75) Inventors: Hans Weickel, Mannheim (DE); Karl Stellwagen, Frankenthal (DE); Olaf Berger, Waldsee (DE)

(73) Assignee: Deutz Aktiengessellschaft, Cologne (DE)

( * ) Notice: Subject to any disclaimer, the term of this patent is extended or adjusted under 35 U.S.C. 154(b) by 0 days.

(21) Appl. No.: 10/480,912

(22) PCT Filed: Jul. 2, 2002

(86) PCT No.: PCT/EP02/07270

§ 371 (c)(1),
(2), (4) Date: Dec. 15, 2003

(87) PCT Pub. No.: WO03/008777

PCT Pub. Date: Jan. 30, 2003

(65) Prior Publication Data

US 2004/0194753 A1 Oct. 7, 2004

(30) Foreign Application Priority Data

Jul. 7, 2001 (DE) .......................................... 101 33 190

(51) Int. Cl.[7] .............................................. F02M 19/00
(52) U.S. Cl. ..................... 123/267; 123/274
(58) Field of Search ................. 123/267, 274, 123/286

(56) References Cited

U.S. PATENT DOCUMENTS

| 3,633,553 | A | * | 1/1972 | Holzapfel | 123/274 |
| 4,239,023 | A | * | 12/1980 | Simko | 123/275 |
| 4,306,526 | A | | 12/1981 | Schaub et al. | |
| 4,638,777 | A | | 1/1987 | Fanner et al. | |
| 4,892,070 | A | * | 1/1990 | Kuhnert | 123/274 |
| 5,555,868 | A | | 9/1996 | Neumann | |
| 6,095,112 | A | | 8/2000 | Glauber et al. | |

FOREIGN PATENT DOCUMENTS

| DE | 29 21 997 A1 | 12/1979 |
| EP | 0 906 500 B1 | 9/2000 |
| JP | 08121256 | 5/1996 |
| JP | 10047096 | 2/1998 |
| JP | 10047165 | 2/1998 |
| JP | 10153145 | 6/1998 |
| JP | 2000320369 | 5/1999 |

* cited by examiner

*Primary Examiner*—Mahmoud Gimie
(74) *Attorney, Agent, or Firm*—Charles L. Schwab; Nexsen Pruet, LLC

(57) ABSTRACT

The invention relates to a method for operating an internal combustion engine, and air/gas mixture being introduced into the working chamber thereof and ignited by means of an ignition system. The above is carried out whereby the air/gas mixture is at least temporarily enriched. A channel (14a, 14b) is let into the cylinder head (1) from a cylinder head external wall into the working chamber (5) or a pre-combustion chamber and a gas or a gas/air mixture may be introduced in a controlled manner into the working chamber (5) or the pre-combustion chamber, by means of said channel (14a, 14b). According to the invention, the above embodiment or method permits the cycle variations in the combustion pressure to be avoided.

11 Claims, 2 Drawing Sheets

PRE-COMBUSTION CHAMBER ENRICHMENT

BACKGROUND OF THE INVENTION

This invention relates to a method for operating an internal combustion engine having a crankcase in which there is rotatably supported a crankshaft to which there is articulated at least one connecting rod, which bears a piston that is moved in a cylinder covered by a cylinder head so as to form a working chamber, an air-gas mixture being supplied as main fuel to the working chamber via a charge changing duct in the cylinder head, the supplied air-gas mixture being at least momentarily enriched with an enriching fuel, an ignition device being present in the cylinder head and the enriching fuel being introduced into an ignition chamber of the ignition device. The invention further relates to an internal combustion engine so fashioned.

Such a method and such an internal combustion engine are known from DE 29 21 997 A1. This document discloses an ignition system for a gas engine in which an insert, made up of a cylindrical assembly that accepts an ignition device and an enriching fuel supply tube fashioned as a duct together with an ignition chamber positioned ahead of the cylindrical assembly on the combustion chamber side, is inserted into the cylinder head. Statements are further made as to stoichiometric air/fuel mixtures of the air-gas mixture and of the enriching fuel.

The further known EP 0 906 500 B1 discloses an ignition system for a gas engine in which an ignition chamber is inserted into the cylinder head, in which ignition chamber an air-gas mixture can be inflamed via an ignition device. The ignition chamber can be sealed off from the working chamber of the internal combustion engine. This design makes possible an exact and reliable determination of the time of inflammation of the air-gas mixture.

SUMMARY OF THE INVENTION

It is an object of the invention to furnish an internal combustion engine and a method for operating the internal combustion engine with which dependable operation of the internal combustion engine is possible.

This object is achieved in that the enriching fuel is a gas-air mixture, that the composition of the enriching fuel is adjustable and that the enriching fuel is withdrawn via a withdrawal probe from a gas mixer for adjustment of the main fuel. To this end, a (multisectioned) duct extending from a cylinder head outside wall into the ignition chamber is worked into the cylinder head in the correspondingly fashioned internal combustion engine. In the case of multi-cylinder internal combustion engines, it is possible to combine the ducts inside or outside the cylinder head. A gas or a gas-air mixture is conveyable into the ignition chamber in a controlled manner via the duct. This design or respectively this method makes it possible to diminish the existing cyclical fluctuations in the ignition pressure. As a consequence, smaller cyclical fluctuations result in a drop in fuel consumption. More-uniform combustion, which is a direct consequence of diminished cyclical fluctuations, has the further advantage of smoother running of the internal combustion engine, because individual extremely high ignition-pressure peaks do not occur. As a further result, the mechanical loading of the components of the internal combustion engine is lower.

The gas can be for example natural gas and the gas-air mixture preferably has a different composition from the air-gas mixture, in particular one that is more easily ignitable. The composition of the gas-air mixture is adjustable. In this way, if on the one hand the composition of the main fuel varies, for example if the gas content drops, continuous and dependable ignition of the main fuel can be achieved through a corresponding increase in the gas content in the enriching fuel. If on the other hand the composition of the main fuel is constant, varying the composition of the enriching fuel makes it possible to address varying requirements with respect to the operation of the internal combustion engine. The composition is preferably adjusted using an electronically controlled controller or regulator, which performs the adjustment on the basis of information about the desired operation of the internal combustion engine as well as an interpretation using characteristic curves and/or using operating conditions determined for example with sensors (gas, detonation, temperature).

In a preferred development, the enriching fuel is withdrawn via a withdrawal probe from a gas mixer for adjustment of the main fuel, the position of the withdrawal intake hole of the withdrawal probe in further development being variable relative to the gas stream in the gas mixer. This development represents only a relatively slight construction expense, with which, however, a dependably operating system is implemented.

In development, the ignition chamber can be purged with a purge gas. This purge is carried out in order to clear residual gases from the ignition chamber after combustion has taken place. These can degrade the quality of newly supplied enriching fuel and/or contaminate the ignition chamber including the ignition device. The purge gas can be the unchanged enriching fuel or, however, can also be air alone through reduction or shutoff of the gas supply. Because of the small quantity of purge gas, however, purging with enriching fuel is possible and poses no problems.

It is pointed out that in the context of the invention the gas or the gas-air mixture can also be introduced into the working chamber and/or a prechamber in the cylinder head. Here the selection is made in particular according to the size of the working chamber. The prechamber is preferably the ignition chamber of the chamber plug that is inserted into the cylinder head, it naturally also being possible that the prechamber is inserted directly into the cylinder head as a self-contained chamber.

Further, a flame filter is inserted into every duct leading to an ignition chamber or a working chamber in order to prevent flames from backfiring.

In development of the invention, a valve governing the duct is built into the chamber plug. This valve can be a check valve, a controlled valve or a valve with throttle action. The degree of enrichment is adjusted with this valve. Dependable cooling of the valve is guaranteed and carbon buildup on the valve is prevented in particular when the valve is arranged in the region of the seal seat of the chamber plug.

With regard to the ignition of the air-gas mixture, it can be stated in general that in the case of internal combustion engines with large working chamber this ignition is effected via a chamber plug having an enlarged prechamber or respectively ignition chamber for the more rapid inflammation of the air-gas mixture in the working chamber. In the case of internal combustion engines with smaller working chamber, a conventional, more economical ignition plug is often adequate for good inflammation. In this case, the duct opens directly into the working chamber. The advantage of this concept is that no substantial gas pressure need be present.

In the case of enrichment with a gas-air mixture, two or a plurality of check valves can also be provided.

BRIEF DESCRIPTION OF THE DRAWINGS

Further advantages of the invention can be inferred from the description of the Drawings, in which an exemplary embodiment of the invention is described in greater detail. In the Drawings:

FIG. 1 is a partial section through a cylinder head 1 of an internal combustion engine that is designed on the basis of an auto ignition internal combustion engine for operation with an air-gas mixture. Cylinder head 1 rests on a crankcase or manifold 2 of the internal combustion engine. A cylinder liner 3 in which a piston 4 is movable is held between manifold 2 and cylinder head 1. A working chamber 5 is formed between piston 4 and cylinder head 1, an air-gas mixture being supplied to working chamber 5 and again removed after combustion via charge changing ducts that are governed by a valve train 6. Valve train 6 is actuated by a camshaft in the crankcase of the internal combustion engine and has push rods 7 and rocker arms 8 to actuate the charge changing valves.

Figure 1:
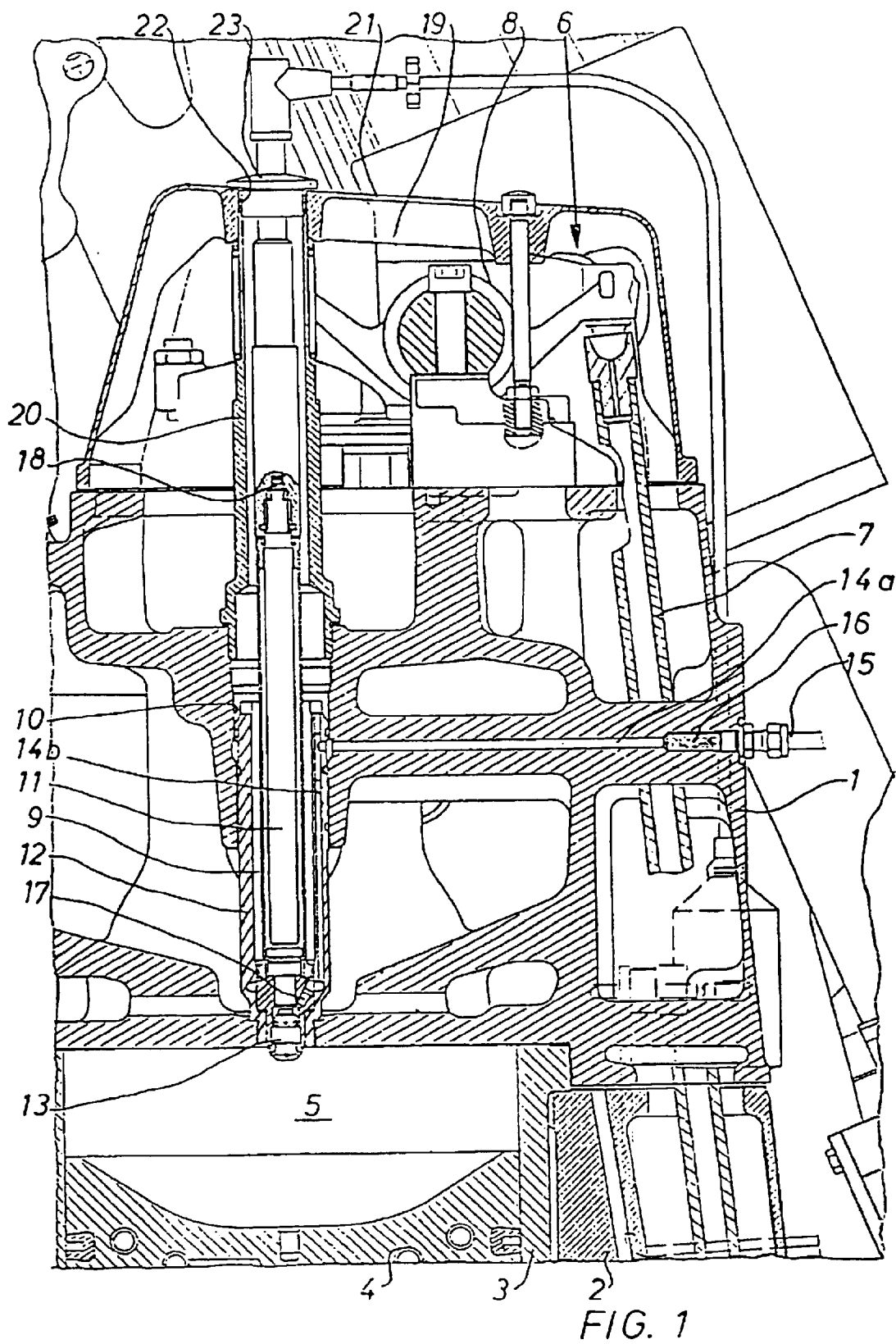
FIG. 1 is a partial section through a cylinder head.

In order to ignite the air-gas mixture in working chamber 5, a chamber plug 9 is inserted into a recess 10 in cylinder head 1. Chamber plug 9 has ignition plug 11 proper, which is built into a sleeve 12 inserted into recess 10. Supported upstream in the end region of chamber plug 9 facing toward working chamber 5 there is arranged an ignition chamber 13 in sleeve 12 of ignition plug 11, into which ignition chamber air-gas mixture enters from working chamber 5 via one or a plurality of passages. This air-gas mixture is inflamed by ignition plug 11. In order to diminish the existing cyclical fluctuations in the ignition pressure, the air-gas mixture inlet to ignition chamber 13 can be enriched in a purposeful way. This enriching is effected by supplying a gas, especially natural gas, or a gas-air mixture directly into ignition chamber 13. This is done via a duct 14a worked into cylinder head 1, which duct is guided from a cylinder head wall into recess 10, and is further conveyed via a further duct 14b in sleeve 12 into ignition chamber 13. Duct 14a is connected on the side opposite recess 10 to a gas supply line 15. Advantageously in the region of this connection, a flame filter 16 is inserted into cylinder head 1 or respectively duct 14a, which flame filter prevents flames that may possibly backfire in duct 14a from reaching gas supply line 15. A valve 17 is inserted into sleeve 12 of chamber plug 9 in the region of seal seat 24 upstream of ignition chamber 13, with which valve the quantity of gas or respectively gas-air mixture supplied to ignition chamber 13 is controlled.

Chamber plug 9 has its electrical connection intruding into the region of rocker arm chamber 19 lying above cylinder head 1 and is shielded there from in oil-tight fashion by a clamping shell 20, which can be screwed into cylinder head 1 and fixes chamber plug 13 immovably in recess 10. Clamping shell 20 in turn cooperates with a rocker arm cover 21 or respectively is guided to a through hole 22 in rocker arm cover 21. Through hole 22 can be closed by a cap 23 with simultaneous through passage of the electrical connection for igniter plug 11.

Figure 2:
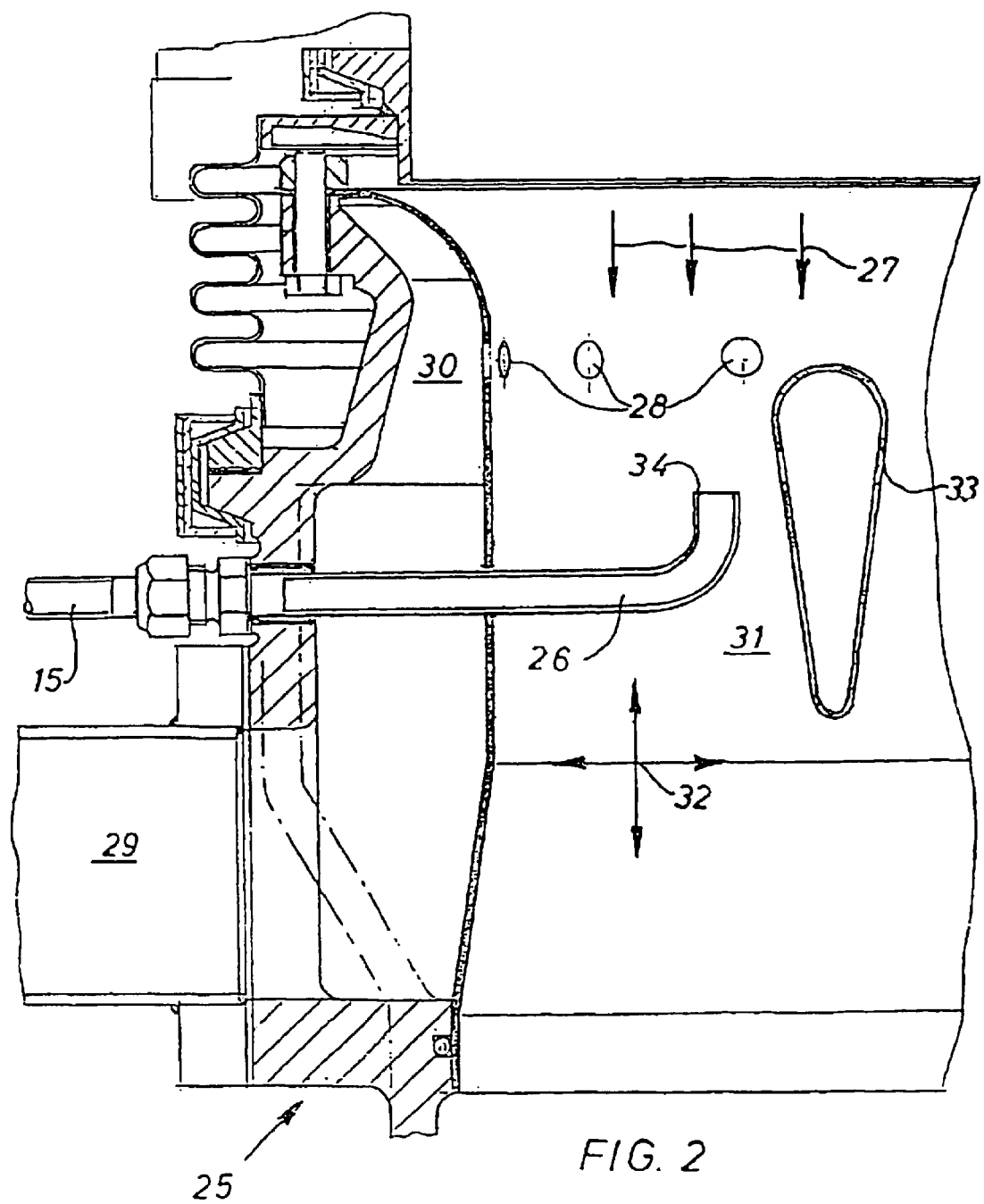
FIG. 2 is a partial section through a gas mixer with intruding withdrawal probe for the enriching fuel.

FIG. 2 is a partial section through a gas mixer 25 with intruding withdrawal probe 26 for the enriching fuel. Air flows through Venturi tube 31 of gas mixer 25 in the direction indicated by arrows 27. Gas, for example natural gas, is introduced into Venturi tube 31 from holes 28. The gas is conveyed in a controllable manner via a supply line 29 into an annular space 30 from which holes 28 issue. In Venturi tube 31, the air is mixed with the gas to form the main fuel, the air-gas mixture. The air-gas mixture can be adjusted by sliding Venturi tube 31 and/or withdrawal probe 26 in one of the directions indicated by arrows 32, baffle 33 being arranged in a fixed position. The position of withdrawal probe 26 relative to baffle 33 is adjusted by the act of sliding. This brings about a change in the diameter of Venturi tube 31 in the region of the point of withdrawal. In this way, the gas-air mixture entering withdrawal probe 26 through withdrawal inlet hole 34 to form the enriching fuel is also varied.

What is claimed is:

1. A method for operating an internal combustion engine having a crankcase rotatably supporting a crankshaft to which there is articulated at least one connecting rod, which bears a piston that is moved in a cylinder covered by a cylinder head so as to form a working chamber, an air-gas mixture being supplied to said working chamber as a main fuel via a gas mixer in a charge changing duct in the cylinder head, said supplied air-gas mixture being at least momentarily enriched with an enriching fuel, an ignition device being present in said cylinder head and said enriching fuel being introduced into an ignition chamber of said ignition device, wherein the enriching fuel is a gas-air mixture of adjustable composition and wherein the enriching fuel is an air-gas mixture withdrawn from said gas mixer by a withdrawal probe.

2. The method of claim 1 wherein said withdrawal probe has an inlet hole, the position of which is adjustable relative to the gas stream in said gas mixer.

3. The method of claim 1 wherein said ignition chamber is purged with a purge gas.

4. A method of operating an internal combustion engine having a crankcase rotatably supporting a crankshaft to which there is articulated at least one connecting rod bearing a piston reciprocable in a cylinder in the crankcase said cylinder being covered by a cylinder head to form a working chamber, a charging duct in said cylinder head, an air-gas mixer adjusting the main fuel supplied to said charging duct and an ignition device with an ignition chamber in said cylinder head, said method including the steps of:

withdrawing a gas-air enriching fuel from said air-gas mixer with a withdrawal probe and delivering said withdrawn gas-air enriching fuel to said ignition chamber.

5. The method of claim 4 wherein said probe has an inlet hole and including the step of adjusting the position of said inlet hole relative to the gas stream in said gas-air mixer.

6. In an internal combustion engine including a crankcase having a cylinder rotatably supporting a crankshaft connected to a piston by a connecting rod which reciprocates said piston in said cylinder, a cylinder head covering said cylinder to form a working chamber and a main fuel gas mixer supplying an air-gas mixture to said working chamber, the combination comprising:

an ignition plug seated in said cylinder head including an ignition chamber in communication with said working chamber, a probe extending into said main fuel gas mixer, and a duct connecting said ignition chamber to said probe whereby an enriching air-gas mixture from said main fuel gas mixture is fed to said ignition chamber.

7. The internal combustion engine of claim 6 wherein a valve governing flow of said enriching air-gas in said duct is built into said ignition plug.

8. The internal combustion engine of claim 7 wherein said valve is a check valve.

9. The internal combustion engine of claim 8 wherein said valve is at the seat of said ignition plug in said cylinder head.

10. The internal combustion engine of claim 6 having means for adjusting the composition of said enriching air-gas mixture.

11. The internal combustion engine of claim 10 wherein said means include an intake hole in said probe which is adjustable relative to the gas stream in said main fuel-gas mixer.

* * * * *